(12) United States Patent
Franchitti et al.

(10) Patent No.: US 10,788,395 B2
(45) Date of Patent: Sep. 29, 2020

(54) METHOD AND DEVICE OF PROCESSING OF VIBRATION SENSOR SIGNALS

(71) Applicant: Aktiebolaget SKF, Gothenburg (SE)

(72) Inventors: Julian Franchitti, Biggar (GB); Allan Thomson, Lanark (GB)

(73) Assignee: AKTIEBOLAGET SKF, Gothenburg (SE)

( * ) Notice: Subject to any disclaimer, the term of this patent is extended or adjusted under 35 U.S.C. 154(b) by 276 days.

(21) Appl. No.: 15/429,877

(22) Filed: Feb. 10, 2017

(65) Prior Publication Data

US 2018/0231413 A1  Aug. 16, 2018

(51) Int. Cl.
  *G01M 13/045* (2019.01)
  *G01H 1/00* (2006.01)
  (Continued)

(52) U.S. Cl.
  CPC ......... *G01M 13/045* (2013.01); *F16C 19/527* (2013.01); *G01H 1/003* (2013.01);
  (Continued)

(58) Field of Classification Search
  CPC .... G01N 29/40; G01N 29/42; G01N 29/4463; G01N 29/14; G01N 2291/2696;
  (Continued)

(56) References Cited

U.S. PATENT DOCUMENTS 3,924,456 A * 12/1975 Vahaviolos ............. G01H 1/00
                                                   73/587
4,089,055 A * 5/1978 Dyer ....................... G01H 1/003
                                                   702/56
(Continued)

FOREIGN PATENT DOCUMENTS

GB         2529484 A  *  2/2016  ............... G01H 5/00
JP         60187821 A *  9/1985  ............. G01H 1/003
(Continued)

OTHER PUBLICATIONS

Janjarasjitt et al, Bearing condition diagnosis and prognosis using applied nonlinear dynamical analysis of machine vibration signal, of Sound and Vibration 317 (2008) 112-126 (Year: 2008).*

(Continued)

*Primary Examiner* — David L Singer
(74) *Attorney, Agent, or Firm* — Garcia-Zamor Intellectual Property Law, LLC; Ruy Garcia-Zamor; Bryan Peckjian

(57) ABSTRACT

A method and apparatus of condition monitoring and detection of vibration generated from at least two different sources using a single sensor/transducer is provided. The method and apparatus provides switchably adapting signal processing, such as amplification and frequency filtering, to one at a time of the at least two different signal sources. An example of which is vibration sources. This adapts the analogue signal from the sensor/transducer to the analogue to digital converter and any further optional analogue signal processing, so that it is possible to maximize use of available dynamic range of these and without any saturation of these. Suitably, the signal processing to analyze the vibration signals is also appropriately adapted to the vibration source in question.

7 Claims, 3 Drawing Sheets

(51) Int. Cl.
  *F16C 19/52* (2006.01)
  *G01N 29/44* (2006.01)
  *G01L 1/25* (2006.01)
  *G01N 29/42* (2006.01)
  *G01N 29/14* (2006.01)

(52) U.S. Cl.
  CPC .............. *G01L 1/255* (2013.01); *G01N 29/14* (2013.01); *G01N 29/42* (2013.01); *G01N 29/4463* (2013.01); *G01N 2291/2696* (2013.01)

(58) Field of Classification Search
  CPC ... F16C 2233/00; F16C 19/527; G01H 1/003; G01M 13/045; G01L 1/255
  USPC ................ 73/593, 660; 702/56, 587, 34, 39; 384/448; 340/682; 367/13; 381/58
  See application file for complete search history.

(56) References Cited

U.S. PATENT DOCUMENTS

| | | | | |
|---|---|---|---|---|
| 4,790,190 A * | 12/1988 | Bambara | ................. | B61K 9/04 246/169 S |
| 4,991,442 A * | 2/1991 | Matsumoto | ............ | F16C 19/52 73/660 |
| 5,633,811 A * | 5/1997 | Canada | .................... | G01H 1/00 702/190 |
| 5,679,900 A * | 10/1997 | Smulders | ................ | G01H 1/12 162/262 |
| 5,698,788 A * | 12/1997 | Mol | ......... | G01H 1/12 702/56 |
| 5,811,683 A * | 9/1998 | Yoshioka | ............ | G01M 13/045 324/207.25 |
| 5,852,793 A * | 12/1998 | Board | .................... | G01H 1/003 702/56 |
| 5,895,857 A * | 4/1999 | Robinson | ............... | G01H 1/003 73/602 |
| 6,526,829 B1 * | 3/2003 | Lysen | ................... | G01H 1/003 73/593 |
| 2002/0083773 A1 * | 7/2002 | Ben-Romdhane | ...... | F16C 19/52 73/660 |
| 2004/0182183 A1 * | 9/2004 | Brand | ................ | G01M 13/045 73/865.9 |
| 2006/0167659 A1 * | 7/2006 | Miyasaka | ............... | B61F 15/20 702/185 |
| 2007/0118333 A1 * | 5/2007 | Miyasaka | ............... | B61F 15/20 702/183 |
| 2008/0033695 A1 * | 2/2008 | Sahara | .................. | G01H 1/003 702/185 |
| 2008/0234964 A1 * | 9/2008 | Miyasaka | ............. | G01H 1/003 702/113 |
| 2009/0093975 A1 * | 4/2009 | Judd | ..................... | G01H 13/00 702/34 |
| 2009/0178485 A1 * | 7/2009 | Thomas | ............... | G01N 29/043 73/627 |
| 2011/0041611 A1 * | 2/2011 | Hofer | .................... | G01H 1/003 73/579 |
| 2011/0251826 A1 * | 10/2011 | McGoogan | ........... | G01H 1/003 702/189 |
| 2011/0265569 A1 * | 11/2011 | Ganji | ..................... | F16C 19/52 73/587 |
| 2012/0041695 A1 * | 2/2012 | Baldwin | ................ | G01H 1/003 702/56 |
| 2012/0239716 A1 * | 9/2012 | Murray | ................. | G01M 13/04 708/160 |
| 2013/0116936 A1 * | 5/2013 | Yamamoto | ............. | F16C 19/52 702/34 |
| 2014/0039809 A1 * | 2/2014 | Girondin | ................. | G01H 1/00 702/39 |
| 2014/0090472 A1 * | 4/2014 | Lysen | .................... | G01H 1/003 73/587 |
| 2014/0123760 A1 * | 5/2014 | Klos | ................... | G01M 13/045 73/593 |
| 2014/0169715 A1 * | 6/2014 | Hebrard | ................. | F16C 41/00 384/448 |
| 2015/0048952 A1 * | 2/2015 | Murphy | ............. | G01M 13/045 340/682 |
| 2015/0081230 A1 * | 3/2015 | Hamilton | .............. | G01M 13/04 702/34 |
| 2015/0127272 A1 * | 5/2015 | Sundquist | ........... | G05B 23/024 702/33 |
| 2015/0226603 A1 * | 8/2015 | Hedin | .................... | G01H 1/003 702/39 |
| 2015/0300405 A1 * | 10/2015 | Erskine | ................ | F16J 15/3296 384/448 |
| 2016/0033363 A1 * | 2/2016 | Murray | ............... | G01M 13/045 702/56 |
| 2016/0108969 A1 * | 4/2016 | Wei | ........................ | F16C 19/28 384/448 |
| 2017/0003163 A1 * | 1/2017 | Baldwin | ................ | G01H 1/003 |

FOREIGN PATENT DOCUMENTS

| | | | |
|---|---|---|---|
| JP | 63081208 A | * | 4/1988 |
| JP | 02171619 A | * | 7/1990 |

OTHER PUBLICATIONS

Heath, Digital Filters vs Analog Filters (Year: 2016).*
Texas Instruments, Application Note 779 A Basic Introduction to Filters Active, Passive, and Switched Capacitor (Year: 2011).*
Jain, Modern Digital Electronics, Tata McGraw Hill Education Private Limited, p. 523 (Year: 2010).*
Xie, Practical Filter Design Challenges and Considerations for Precision ADCs, Analog Dialogue 50-04, Apr. 2016 (Year: 2016).*

* cited by examiner

METHOD AND DEVICE OF PROCESSING OF VIBRATION SENSOR SIGNALS

FIELD OF THE INVENTION

The invention concerns condition monitoring and processing of sensor signals and is more particularly directed to the optimization of the processing of sensor signals, such as vibration signals, generated from two different sources, such as from bearings and wheels.

BACKGROUND OF THE INVENTION

Condition monitoring systems are intended to determine the condition of a monitored equipment/machine/part and also hopefully detect a failure about to happen, before it happens. This is traditionally accomplished by measuring one or more physical parameters of the monitored machine/equipment/part to try and detect something out of the ordinary, which can for example be a temperature going outside a predetermined range that is considered to be a normal operating range, to thereby generate a warning. In the field of rolling element bearings, it is known to attach one or more sensors to measure one or more physical parameters and transduce these physical parameters into electrical signals. Traditionally one sensor is used for each parameter of each part of a machine/equipment that is to be monitored. For rotating machinery comprising for example shafts, rolling element bearings, and wheels there might for example be a desire to measure one physical parameter, vibration. This would lead to the implementation of one vibration sensor on each shaft, each bearing and each wheel. It might not be convenient or desirable to mount a sensor on each part. There is still room for improvements.

BRIEF SUMMARY OF THE INVENTION

An object of the invention is to define a method and apparatus for processing for example vibration signals generated from at least two different sources measured and converted to electrical signals by a single vibration sensor/transducer or accelerometer. The invention is more specifically well suited for processing wheel flats and bearing vibration signals from a single vibration sensor/transducer such as a piezoelectric vibration/shock crystal sensor/transducer in railway applications. Wheel flats occur when there is a level spot on the surface of a wheel which comes into contact with the rail that the wheel is running on. During this contact very high levels of acceleration are generated reaching tens of G (hundreds of m/s^2). On the other hand bearing vibration damage, such as spalling for example, is generally characterized by very low levels of acceleration, typically less than 1 G (less than 9.8 m/s^2) caused when a bearing roller is excited by passing over a defect surface area in the outer or inner raceways. Using a standard pre-amplifier and filter circuit from a single piezoelectric element for both defects would not be suitable as either the high levels of acceleration from the wheel flats would cause the circuit to saturate or the low levels of acceleration from the bearing damage would disappear in circuit noise. Also since the two mechanisms excite different frequency ranges they require two different filter bands in the signal processing. Therefore an alternative solution is required, especially for cost and space sensitive designs to enable an efficient method of detecting wheel flats and bearing damage using a single circuit.

Existing condition monitoring systems are wired, higher cost and therefore do not have the constraints of low cost wireless based systems. Such wired systems such as the SKF iMx-R have expensive hardware capable of sampling raw vibration at high frequencies and at a high resolution allowing the detection of wheel flats and vibration damage from a single accelerometer. This requires very high resolution analogue to digital converters and any preceding analogue signal processing with an extremely wide dynamic range, that is extremely low noise analogue circuitry.

Low cost systems do not have the same capabilities in terms of processing power, sampling resolution and sampling speeds. Use of low cost electronic components with the methods detailed herein enables the creation of a low cost product capable of detecting for example bearing damage and wheel flats with the use of a single sensor/transducer.

The aforementioned objects are achieved according to the invention by switchably adapting signal processing, such as amplification and possibly frequency filtering, to one at a time of at least two different signal sources, such as vibration sources, each source having a different dynamic range. The signal processing adaption is at least to an analogue amplification of an analogue signal from a single transducer, before any further optional analogue signal processing and before an analogue to digital conversion by an analogue to digital converter. This to adapt the analogue signal from the transducer to the analogue to digital converter and any further optional analogue signal processing, so that it is possible to maximize use of available dynamic range of these and without any saturation of these. The optional analogue signal processing may provide analogue filter(s) and further amplifier(s). Suitably, if the two or more signal sources, such as vibration sources generating vibration signals of interest within different frequency spectrums/ranges, then in addition to adapting the analogue amplification, further signal processing will preferably also switchably adapt any frequency filtering to thereby be able to properly extract the vibration signals of interest from the vibration source in question. Suitably the signal processing to analyze the vibration signals is also appropriately adapted to the vibration source in question.

The aforementioned objects are also achieved according to the invention by a vibration measurement assembly. The assembly provides a sensor, a control unit and a signal processing unit. The sensor converts mechanical vibration to electrical sensor signals, the mechanical vibration originates from at least two different vibration sources. These different vibration sources can for example be bearing damage and wheel flats (railway). The at least two different vibration sources each generate mechanical vibration that differ from each other by at least one mechanical vibration characteristic, for example amplitude and/or basic vibration frequency. The sensor is suitably attachable directly or indirectly to a rolling element bearing. According to the invention the control unit is arranged to logically control the signal processing unit either by a time schedule or in dependence of the electrical sensor signals or a combination thereof. There can be some indication if there are vibration signals from just one of the sources or both at the same time. The signal processing unit is part of a signal path of the electrical sensor signals, and is controllably adaptable by the control unit to signal process the electrical sensor signals according to one or the other of the at least two different vibration sources in view of the at least one differing mechanical vibration characteristic.

Suitably the at least one mechanical vibration characteristic is one or more of amplitude, vibration frequency range, vibration frequency bandwidth, vibration duty cycle and vibration recurrence frequency. In some embodiments the signal processing unit provides a variable amplification unit in the analogue domain of the signal path, the control unit controlling an amplification factor of the variable amplification unit in view of an amplitude mechanical vibration characteristic of a vibration source in question. The variable amplification unit can provide an amplifier in the signal path, where an amplification factor of the amplifier can be controlled by the control unit. Alternatively the variable amplification unit can provide multiple signal paths switchably selectable by the control unit, each signal path having a different amplification factor.

Suitably the signal processing unit can also provide a digital variable frequency filter unit in the digital domain of the signal path. The control unit controls a frequency filter characteristic of the digital variable frequency filter in view of a mechanical vibration characteristic of a vibration source in question.

In addition to the digital variable filter or alternatively to it the signal processing unit can also provide an analogue variable frequency filter unit in the analogue domain of the signal path. The control unit controlling a frequency filter characteristic of the analogue variable frequency filter in view of a mechanical vibration characteristic of a vibration source in question. The analogue variable frequency filter unit can for example in the signal path provide an analogue frequency filter that is controllable by the control unit. Alternatively the analogue frequency filter unit can for example provide multiple signal paths switchably selectable by the control unit, wherein each signal path has a different frequency filter characteristic.

In embodiments with both one or more variable amplification units and one or more variable frequency units in the analogue and/or digital domain, the control unit will coordinate control of amplifiers and filters according to which vibration source is being processed.

Other advantages of this invention will become apparent from the detailed description.

BRIEF DESCRIPTION OF THE SEVERAL VIEWS OF THE DRAWING

The invention will now be described in more detail for explanatory, and in no sense limiting, purposes, with reference to the following figures, in which.

DETAILED DESCRIPTION OF THE INVENTION

In order to clarify the method and device according to the invention, some examples of its use will now be described in connection with FIGS. 1 to 6.

Figure 1:
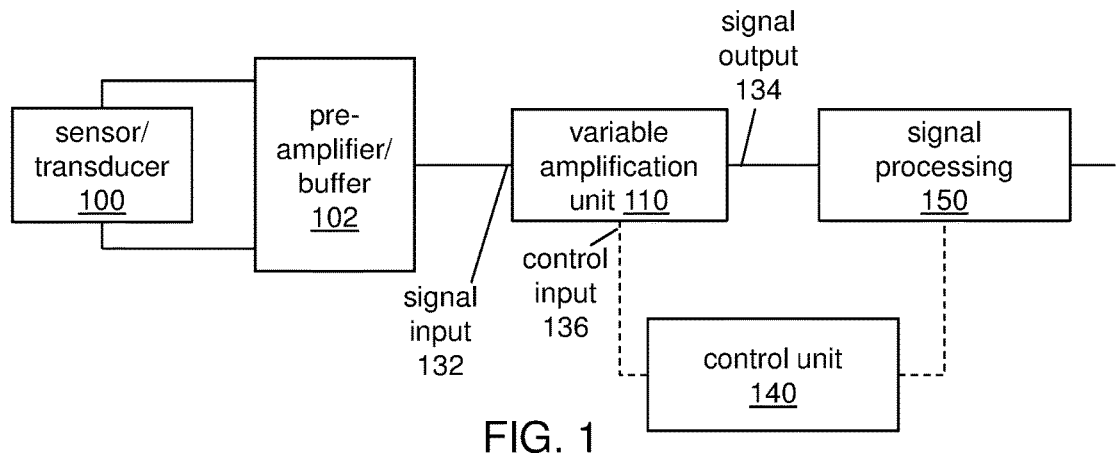
FIG. 1 illustrates a basic block diagram of the invention.

FIG. 1 illustrates a basic block diagram of the invention comprising a sensor/transducer 100, such as a vibration sensor/transducer for example in the form of an accelerometer, piezo electric vibration/shock crystal or the like, coupled to a pre-amplifier/buffer 102. The invention further provides a variable amplification unit 110, a control unit 140 and some further signal processing 150, which can be analogue and/or digital. The variable amplification unit 110 provides a signal input 132, a signal output 134 and a control input 136. The signal input 132 is coupled to the sensor/transducer pre-amplifier/buffer 102, the signal output 134 is coupled to some further signal processing 150, and the control input 136 is coupled to the control unit 140. The single sensor/transducer 100 is adapted to receive and transform mechanical vibration to electrical signals from at least two different sources. The at least two different sources might for example be wheel flats and bearing damage in railway applications, both generating vibrations of different amplitude and frequency. The control unit 140 determines what source is to be measured and accordingly sets the variable amplification unit 110 to a suitable amplification, an absolute value of which can be larger or smaller than one. The suitable amplification is a value that enables making use of as much as possible of the dynamic range available in the following signal processing and analogue to digital conversion without causing any saturation. This relaxes the requirements of the amplifiers as to available dynamic range, as to low noise amplification to retain a high signal to noise ratio, and relaxes the requirements of the analogue to digital converter as to resolution. Maybe an eight-bit analogue to digital converter is enough if all that dynamic range can be made use of for the conversion. Thus a high amplification is set for a source with an expected weak vibration/signal strength and a low or no amplification, possibly even dampening, is set for a selected source with an expected strong vibration/signal strength. The control unit 140 will also control the further signal processing, both that in the analogue and digital domain. The required algorithms to extract wanted information/indications from the vibration signals will most likely differ depending on what the source is and thus what information/indication(s) that is sought. In the given example of one source for vibration signals being wheel flats and the other source being bearing damage, the analysis, preferably done in the digital domain, for extracting desired indication of wheel flats or bearing damage is quite different and requires different signal processing. In addition to the analysis part of the signal processing it might also be different type of filtering required for the different sources as the signals of interest are most likely in different frequency bands. This can be done in the analogue and/or in the digital domain, as controlled by the control unit 140.

Figure 2A:
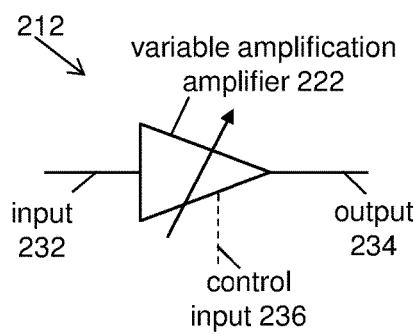
FIG. 2A-2B illustrate embodiments of attaining variable analogue amplification.
Figure 2B:
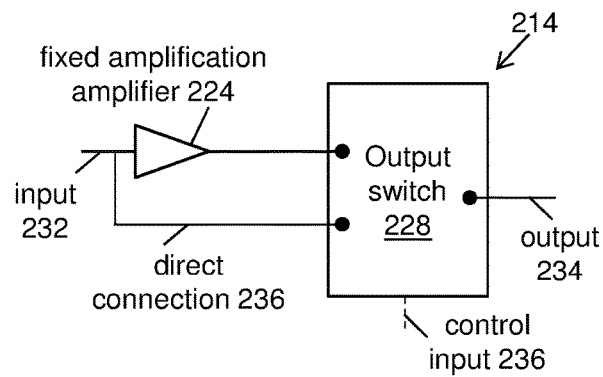

FIGS. 2A and 2B illustrate two embodiments of attaining variable analogue amplification. FIG. 2A illustrates a first variable amplification embodiment 212 having a variable amplification amplifier 222 with an input 232, an output 234, and a control input 236. The variable amplification amplifier 222 can be a type that in response to the control input 236 can continuously change the amplification or stepwise change the amplification. FIG. 2B illustrates a second variable amplification embodiment 214 comprising an output switch 228 and a fixed amplification amplifier 224 connected to an input 232 of the variable amplification unit. In this embodiment the output switch 228 will in dependence of the control input 236 connect an output 234 of the variable amplification unit to either an output of the fixed amplification amplifier 224 or directly to the input 232 of the variable amplification unit via a direct connection 226. The fixed and the variable amplification amplifiers 222, 224 may each have an amplification with an absolute value that is larger, equal to, or a fraction of 1.

Figure 3A:
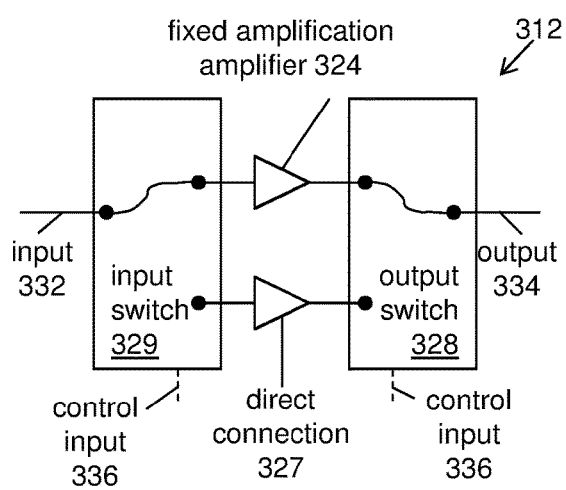
FIG. 3A-3B illustrate further embodiments of variable analogue amplification.
Figure 3B:
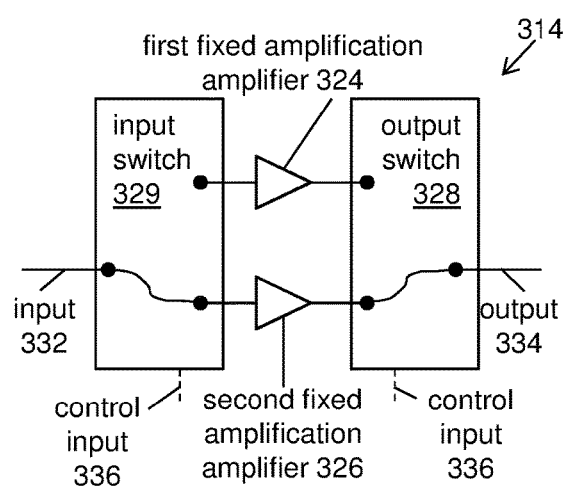

FIGS. 3A and 3B illustrate further embodiments of variable analogue amplification. FIG. 3A illustrates a first variable amplification embodiment 312, similar to the one illustrated in FIG. 2B, comprising a first fixed amplification amplifier 324, an output switch 328, and also an input switch 329. The input switch 329 is to make sure that there is no crosstalk between the different amplifications on the input side. An input 332 to the variable amplification unit is fed to the input switch 329, which will in dependence of the state of the control input 336 feed the signal to either the first fixed amplification amplifier 324 or to a direct connection 327 to the output switch 328. The output switch 328 will in dependence of the control input 336 in coordination with the input switch 329 feed an output 334 of the variable amplification unit either with a signal directly from the input 332 of the variable amplification unit or a signal that has been amplified through the first fixed amplification amplifier 324. FIG. 3B illustrates a second variable amplification embodiment 314 comprising a first and a second fixed amplification amplifiers 324, 326, an input switch 329, and an output switch 328. In relation to the first variable embodiment 312 of FIG. 3A, the direct connection 327 is replaced with a second fixed amplification amplifier 326. The first and the second amplification amplifiers 324, 326 may each have an amplification, and suitably different, with an absolute value that is larger, equal to, or a fraction of 1.

Figure 4A:
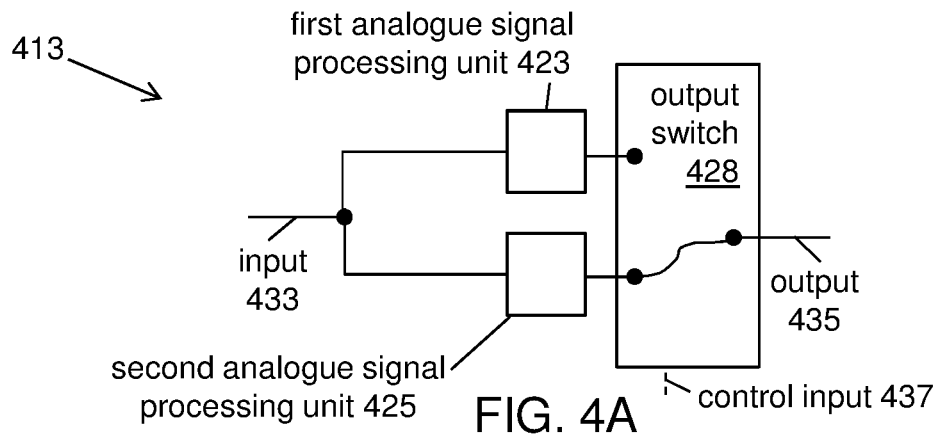
FIG. 4A-4B illustrate examples of switchable analogue signal processing.
Figure 4B:
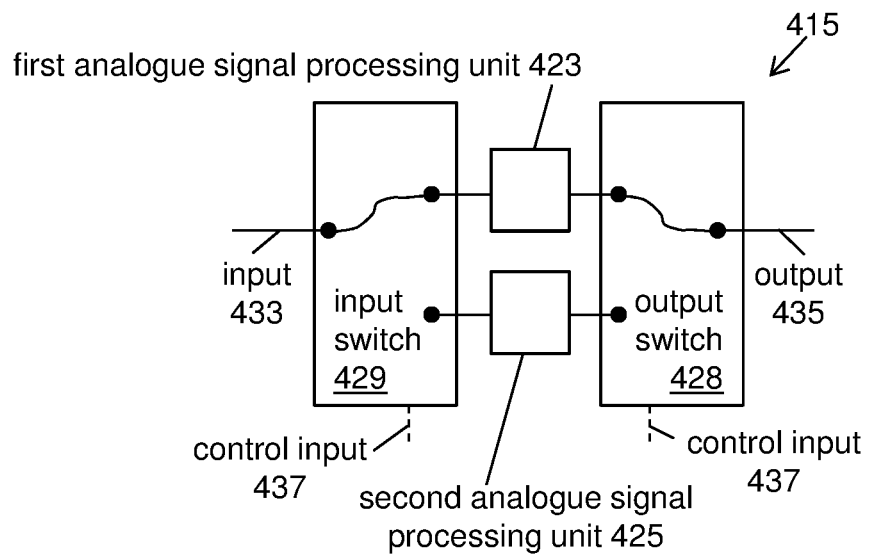

FIGS. 4A and 4B illustrate examples of switchable analogue signal processing. As previously described, it can be that there are further differences in the vibration signals from the at least two different potential vibration sources that in addition to different amplification also need different further signal processing. Such different further signal processing can for example be different types of signal analysis and/or frequency filtering, be it different frequency ranges and/or type of filtering. FIG. 4A illustrates a first analogue signal processing embodiment 413 comprising a first and a second analogue signal processing units 423, 425, an output switch 428, an input 433, an output 435, and a control input 437 for selection of which analogue signal processing unit 423, 425 is to be in the signal path. FIG. 4B illustrates a second analogue processing embodiment 415, which in addition to the first analogue signal processing embodiment 413 also provides an input switch 429 to thereby to minimize the risk of crosstalk between the first and second analogue signal processing units 423, 425 on the input side.

Figure 5:
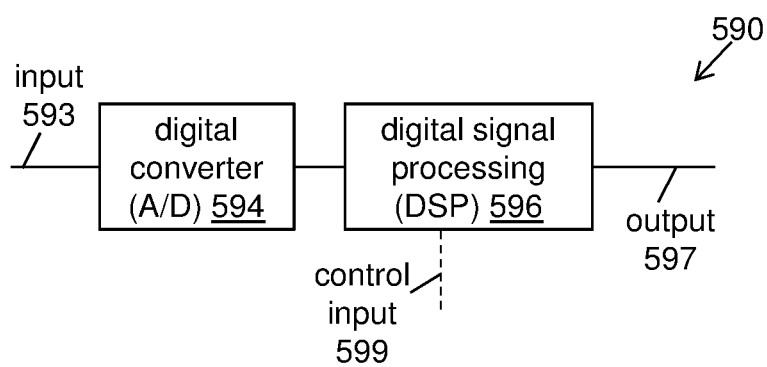
FIG. 5 illustrates an example of a transition between analogue and digital signal processing.

FIG. 5 illustrates an example of a transition between the analogue and digital domains 590. When analogue signal processing is completed, then the analogue processed signal is input 593 to an analogue to digital converter 594. According to the invention the analogue signal will be as large as possible without causing the analogue to digital converter 594 to saturate, to thereby maximize use of the available resolution of the analogue to digital converter 594 to provide further digital signal processing 596 with enough bits to be able to digitally process the vibration signal in such a way that a usable output 597 can be provided independently what vibration source the digital signal processing 596 is controlled 599 to analyze.

Figure 6:
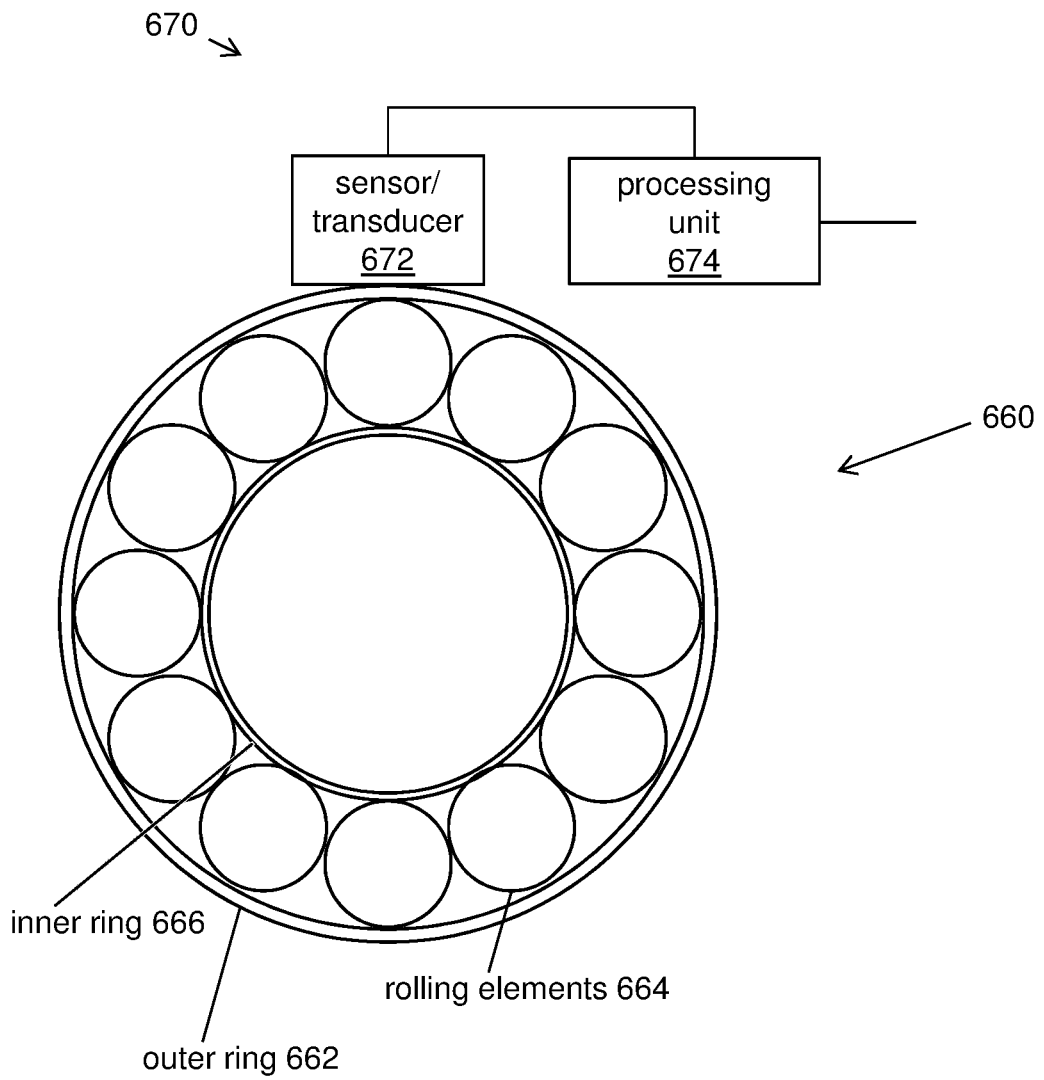
FIG. 6 illustrates an instrumented rolling element bearing according to the invention.

FIG. 6 illustrates an instrumented rolling element bearing 660 with an outer ring 662, rolling elements 664, an inner ring 666 and a sensor arrangement 670. The sensor arrangement 670 will provide at least one sensor/transducer 672 that will deliver its output to a processing unit 674. The processing unit 674 may be housed together with the sensor arrangement 670 or remotely arranged and coupled by wires or wirelessly. The processing unit 674 may in turn be coupled to further processing units and/or reporting channels for the condition/status concerning of for example wheel flats and bearing damage.

An example with vibration signals generated from wheel flats and bearing damage such as spalling. The mechanical vibrations create a voltage in for example a piezoelectric crystal source that is proportional to the input excitation force outputting an electrical vibration signal. A first buffer/amplifier, boosts the incoming signal adding gain. A first switch controls a gain boost unit that allows this signal to be further amplified by routing it through a further amplifier and in the case where the excitation source is from the bearing where the levels of acceleration are low, this optional gain boosts the incoming signal to higher amplitudes for further processing and detection by an analogue to digital converter without saturating any amplifier(s) and the converter. The first switch can be controlled by an embedded processor. In the case where the signal is generated from a wheel flat, the amplitude of the vibration signal from the piezoelectric crystal is higher and the application processor can use the first switch to disable the additional gain stage to avoid saturating any amplifier(s) or the converter allowing the signal to go directly from the buffer/amplifier to further processing. In each case the vibration signal is then fed through processing blocks, which may exist in the analogue or digital domain, to remove out of band frequencies.

A second switch is present prior to the wheel flats and bearing damage processing sections enabling the processor to select the path for the vibration signal accordingly. Using SKF enveloping band 3 (bearing damage processing) for the early detection of bearing faults, requires a specific set of filters; however these would be unsuitable for detecting wheel flats as these occur in a lower frequency band. The presence of the enveloping high pass filter would effectively cancel out the wheel flat signal. By using the second switch the application processor can re-route the vibration signal through the appropriate processing, be it a wheel flats processing block for capturing wheel-flat events or a bearing damage processing block for capturing bearing damage. The key elements of the circuit are the switches as these enable the variable gain and filter stages to be bypassed removing the need for one full circuit dedicated to bearing damage and an additional full circuit dedicated for wheel flat signal processing. Commonly used processing blocks, converters and transducers do not have to be duplicated.

The invention is based on the basic inventive idea of maximizing the use of available dynamic range in the analogue domain for different vibration sources sensed using one and the same sensor/transducer. The invention is not restricted to the above-described embodiments, but may be varied within the scope of the following claims.

FIG. 1 illustrates a basic block diagram of the invention:
100 Vibration sensor,
102 Pre-amplifier/buffer for vibration sensor,
110 Variable amplification unit,
132 Input to variable amplification unit,
134 Output from variable amplification unit,
136 Control input of variable amplification unit,
140 Control unit,
150 Further signal processing, analogue and/or digital.

FIGS. 2A and 2B illustrate embodiments of attaining variable analogue amplification:
212 A first variable amplification embodiment,
214 A second variable amplification embodiment,
222 Variable amplification amplifier, 224 A fixed amplification amplifier,
226 A direct connection,
228 An output switch,
232 Input to variable amplification unit,
234 Output from variable amplification unit,
236 Control input.

FIGS. 3A and 3B illustrate further embodiments of variable analogue amplification:
312 A first variable amplification embodiment,
314 A second variable amplification embodiment,
324 A first fixed amplification amplifier,
326 A second fixed amplification amplifier,
327 A direct connection,
328 An output switch,
329 An input switch,
332 Input to variable amplification unit,
334 Output from variable amplification unit,
336 Control input.

FIGS. 4A and 4B illustrate examples of switchable analogue signal processing:
413 A first analogue signal processing embodiment,
415 A second analogue signal processing embodiment,
423 A first analogue signal processing unit,
425 A second analogue signal processing unit,
428 An output switch,
429 An input switch,
433 Switchable analogue signal processing input,
435 Switchable analogue signal processing output,
437 Signal processing control input.

FIG. 5 illustrates an example a transition between analogue and digital signal processing:
590 Analogue to digital domain,
593 Analogue input,
594 Analogue to digital converter,
596 Digital signal processing,
597 Output from digital signal processing
599 Software control input for controlling the digital signal processing to correspond to the vibration source being processed.

FIG. 6 illustrates an instrumented rolling element bearing
660 Instrumented rolling element bearing
662 an outer ring
664 rolling elements
666 an inner ring
670 a sensor arrangement
672 at least one sensor/transducer
674 a processing unit

The invention claimed is:

1. A vibration measurement assembly comprising:
a sensor, the sensor converts mechanical vibration to electrical sensor signals, the mechanical vibration originating from at least two different vibration sources, the at least two different vibration sources each generate mechanical vibration that differ from each other by at least one mechanical vibration characteristic and which each have a different dynamic range, the sensor being attachable directly or indirectly to a rolling element bearing;
a control unit controlling an amplification factor;
a signal processing unit arranged along a signal path of the electrical sensor signals, the signal processing unit comprising:
a variable amplification unit that provides the amplification factor to the electrical sensor signals of the one or the other of the at least two different vibration sources, wherein the variable amplification unit comprises multiple signal paths switchably selectable by the control unit, each signal path having a different amplification factor such that the sensor can monitor the two separate vibration sources, wherein the control unit adjusts the amplification factor of the selected signal based on the dynamic range of the selected one of the two separate vibration sources,
an analogue variable frequency filter unit in the analogue domain of the signal path, and
a digital variable frequency filter unit in a digital domain of the signal path, the digital domain of the signal processing unit comprising a plurality of bits providing a resolution that accommodates signals from the analogue domain,
wherein the control unit is arranged to logically control the signal processing unit either by a time schedule or in dependence of the electrical sensor signals or a combination thereof, the control unit controlling a frequency filter characteristic of the digital variable frequency filter unit in view of a mechanical vibration characteristic of the one or the other of the at least two different vibration sources, and
wherein the signal processing is controllably adaptable by the control unit to signal process the electrical sensor signals according to one or the other of the at least two different vibration sources in view of the at least one differing mechanical vibration characteristic.

2. The vibration measurement assembly according to claim 1, wherein the at least one mechanical vibration characteristic is one or more of amplitude, vibration frequency range, vibration frequency bandwidth, vibration duty cycle and vibration recurrence frequency.

3. The vibration measurement assembly according to claim 1, wherein the variable amplification unit is in the analogue domain of the signal path, the control unit controlling the amplification factor of the variable amplification unit in view of an amplitude mechanical vibration characteristic of the one or the other of the at least two different vibration sources.

4. The vibration measurement assembly according to claim 1, wherein the variable amplification unit comprises an amplifier in the signal path, where an amplification factor of the amplifier can be controlled by the control unit.

5. The vibration measurement assembly according to claim 1, wherein the control unit controlling a frequency filter characteristic of the analogue variable frequency filter in view of a mechanical vibration characteristic of the one or the other of the at least two different vibration sources.

6. The vibration measurement assembly according to claim 5, wherein the analogue variable frequency filter unit comprises an analogue frequency filter in the signal path, where a frequency filter characteristic of the analogue frequency filter is controllable by the control unit.

7. The vibration measurement assembly according to claim 5, wherein the analogue frequency filter unit comprises multiple signal paths switchably selectable by the control unit, each signal path having a different frequency filter characteristic.

* * * * *